(12) United States Patent
Shimizu et al.

(10) Patent No.: US 12,496,889 B2
(45) Date of Patent: Dec. 16, 2025

(54) VEHICLE

(71) Applicant: TOYOTA JIDOSHA KABUSHIKI KAISHA, Toyota (JP)

(72) Inventors: Tatsuya Shimizu, Okazaki (JP); Katsuya Shimazu, Toyota (JP); Ayaka Kagami, Inazawa (JP); Mutsumi Kawashima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 261 days.

(21) Appl. No.: 18/374,706

(22) Filed: Sep. 29, 2023

(65) Prior Publication Data

US 2024/0123809 A1 Apr. 18, 2024

(30) Foreign Application Priority Data

Oct. 14, 2022 (JP) ................................ 2022-165439

(51) Int. Cl.
*B60K 1/04* (2019.01)
*B62D 35/02* (2006.01)

(52) U.S. Cl.
CPC ........ *B60K 1/04* (2013.01); *B60K 2001/0438* (2013.01); *B60K 2001/0472* (2013.01); *B60K 2001/0488* (2013.01)

(58) Field of Classification Search
CPC .............. B60K 1/04; B60K 2001/0438; B60K 2001/0472; B60K 2001/0422; B60K 2001/0433; B60K 2001/0455; B60K 2001/0488; B62D 35/02; Y02D 60/10
See application file for complete search history.

(56) References Cited

U.S. PATENT DOCUMENTS

| | | | |
|---|---|---|---|
| 2020/0047808 A1* | 2/2020 | Ajisaka | B62D 21/157 |
| 2023/0191886 A1* | 6/2023 | Nabuchi | B60K 1/04 |
| | | | 180/65.1 |

FOREIGN PATENT DOCUMENTS

| | | | | |
|---|---|---|---|---|
| CN | 114940214 A | * | 8/2022 | H01M 10/625 |
| JP | 2020-058150 A | | 4/2020 | |

* cited by examiner

*Primary Examiner* — Tinh Dang
(74) *Attorney, Agent, or Firm* — Dinsmore & Shohl LLP (57) ABSTRACT

A vehicle includes: a vehicle body having a bottom portion; a power storage device including a main body having a front wall portion, a rear wall portion, and a lower surface; and a flow regulation plate having a distal end portion at a position spaced downward from the bottom portion, a protruding portion is provided on the lower surface side of the main body; in a fixed state in which the power storage device is fixed to the vehicle body, the lower surface is located downward of the bottom portion; the flow regulation plate is provided to be pivotable; and in the fixed state, the protruding portion abuts against the flow regulation plate to maintain a state in which the flow regulation plate covers at least one of the front wall portion and the rear wall portion.

6 Claims, 5 Drawing Sheets

VEHICLE

CROSS-REFERENCE TO RELATED APPLICATIONS

This nonprovisional application is based on Japanese Patent Application No. 2022-165439 filed on Oct. 14, 2022 with the Japan Patent Office, the entire contents of which are hereby incorporated by reference.

BACKGROUND

Field

The present disclosure relates to a vehicle in which a power storage device is mounted.

Description of the Background Art

Conventionally, Japanese Patent Application Laid-Open No. 2020-58150 discloses a vehicle-mounted battery determination system in which it is possible to determine whether a battery mounted on a vehicle is a battery for mounting.

Specifically, a first control device having a first storage section for storing battery information is provided on the battery pack side. The vehicle is provided with a second control device which is communicable with the first control device and which stores information of a battery to be mounted on the vehicle.

When the battery pack is mounted on the vehicle, the first control device and the second control device determine whether the battery is a battery for mounting by comparing the information of the battery stored in the first storage unit with the information of the battery for mounting stored in the second storage unit.

SUMMARY

In order to stabilize the vehicle navigation, a battery (power storage device) mounted on the vehicle may be replaced with a new battery. In this case, by mounting the battery replaceably on the bottom side of the vehicle body, the battery can be easily replaced from the outside of the vehicle.

However, when the battery is attached to the bottom portion of the vehicle body, the lower surface side of the battery may protrude downward from the bottom portion of the vehicle body, and the bottom portion of the vehicle body and the lower surface of the battery may not be flat. In this case, there is a concern that a traveling resistance is generated by a step formed between the bottom portion of the vehicle body and the lower surface of the battery.

The present disclosure has been made in view of the above-mentioned problems, and it is an object of the present disclosure to provide a vehicle in which a power storage device can be attached replaceably and in which a traveling resistance due to a portion of the power storage device protruding downward from a bottom portion of a vehicle body can be reduced.

A vehicle based on the present disclosure includes: a vehicle body having a bottom portion; a power storage device including a main body and replaceably fixed to the bottom portion, the main body having a front wall portion, a rear wall portion, and a lower surface, the front wall portion and the rear wall portion facing each other in a front-rear direction of the vehicle body; and a flow regulation plate having a distal end portion at a position spaced downward from the bottom portion. A protruding portion that protrudes from the main body along the front-rear direction is provided on the lower surface side of the main body. In a fixed state in which the power storage device is fixed to the vehicle body, the lower surface of the main body is located downward of the bottom portion. The flow regulation plate is provided to be able to face at least one of the front wall portion and the rear wall portion in the front-rear direction, and pivotable between a state in which the distal end portion is located closer to the power storage device and a state in which the distal end portion is located further away from the power storage device. In the fixed state, the protruding portion abuts against the flow regulation plate to maintain a state in which the flow regulation plate covers a portion, located downward of the bottom portion, of at least one of the front wall portion and the rear wall portion.

In the above-described configuration, when the power storage device is to be removed and moved downward, the flow regulation plate pivots in the direction away from the power storage device (more specifically the front wall portion or the rear wall portion) to thereby enable the power storage device to be moved easily. Further, when the power storage device is to be attached, the power storage device is moved upward while the protruding portion provided on the power storage device abuts against the flow regulation plate, to fix the power storage device at a predetermined location of the vehicle body. At this time, the flow regulation plate pivots to approach the power storage device (more specifically the front wall portion or the rear wall portion) and the protruding portion supports the distal end side of the flow regulation plate, to thereby maintain a state in which the flow regulation plate covers a portion, located downward of the bottom portion of the vehicle body, of at least one of the front wall portion and the rear wall portion. Thus, the airflow along the power storage device can be regulated to thereby reduce the traveling resistance. Moreover, the flow regulation plate is provided to be pivotable to enable replacement of the power storage device and, when the power storage device is to be attached, the protruding portion is caused to abut against the flow regulation plate, to thereby enable the flow regulation plate to be disposed at a predetermined position easily.

In the vehicle according to the above disclosure, the flow regulation plate may be divided into a plurality of flow regulation plates in a left-right direction of the vehicle body.

In the above-described configuration, a plurality of flow regulation plates can be used to regulate the airflow in a wide region and thereby reduce the traveling resistance.

In the vehicle according to the above disclosure, the flow regulation plate may include a first flow regulation plate provided to be able to face the front wall portion from a front side. The front wall portion may include a protruding wall portion protruding frontward and located centrally of the vehicle body in a left-right direction. Respective fastening portions for fixing the power storage device to the bottom portion may be provided on opposite outer sides of the protruding wall portion in the left-right direction. The first flow regulation plate may include respective projecting portions projecting outward of opposite outer sides of the protruding wall portion in the left-right direction. In the fixed state, the projecting portions may have respective portions located frontward of the fastening portions.

In the above-described configuration, the projecting portions can be used to suppress adhesion of foreign matter to the fastening portions.

In the vehicle based on the above disclosure, the main body may include: a housing case having the front wall portion and the rear wall portion and housing a power storage module; and a panel member covering the housing case from below and forming the lower surface. In this case, the protruding portion may be provided on the panel member.

In the above-described configuration, the panel member covering the housing case from below can be used to protect the housing case.

In the vehicle based on the above disclosure, the protruding portion may have an insert portion inserted in the flow regulation plate in the fixed state. The flow regulation plate may have an insert-receiving portion in which the insert portion is inserted.

In the above-described configuration, the insert portion of the protruding portion can be inserted in the insert-receiving portion of the flow regulation plate, to thereby suppress backlash of the flow regulation plate during traveling.

In the vehicle based on the above disclosure, the flow regulation plate may include: a first flow regulation plate having a first distal end portion at a position spaced downward from the bottom portion, and provided to be able to face the front wall portion from a front side; and a second flow regulation plate having a second distal end portion at a position spaced downward from the bottom portion, and provided to be able to face the rear wall portion from a rear side. The protruding portion may include a front-side protruding portion protruding frontward from the main body, and a rear-side protruding portion protruding rearward from the main body. The first flow regulation plate may be provided to be pivotable between a state in which the first distal end portion is located closer to the front wall portion and a state in which the first distal end portion is located further away from the front wall portion. The second flow regulation plate may be provided to be pivotable between a state in which the second distal end portion is located closer to the rear wall portion and a state in which the second distal end portion is located further away from the rear wall portion. In this case, in the fixed state, the front-side protruding portion may abut against the first flow regulation plate to maintain a state in which the first flow regulation plate covers a portion, located downward of the bottom portion, of the front wall portion. In the fixed state, the rear-side protruding portion may abut against the second flow regulation plate to maintain a state in which the second flow regulation plate covers a portion, located downward of the bottom portion, of the rear wall portion.

In the above-described configuration, a portion, which is located downward of the bottom portion, of the front wall portion can be covered with the first flow regulation plate to thereby regulate the airflow from the front side of the vehicle and reduce the traveling resistance. Moreover, a portion, which is located downward of the bottom portion, of the rear wall portion can be covered with the second flow regulation plate to thereby suppress disturbance of the airflow on the rear wall side. In this way, the traveling resistance can further be reduced.

The foregoing and other objects, features, aspects and advantages of the present disclosure will become more apparent from the following detailed description of the present disclosure when taken in conjunction with the accompanying drawings.

DETAILED DESCRIPTION

Hereinafter, embodiments of the present disclosure will be described in detail with reference to the drawings. In the following embodiments, the same or common portions are denoted by the same reference numerals, and description thereof will not be repeated.

Embodiment 1

Figure 1:
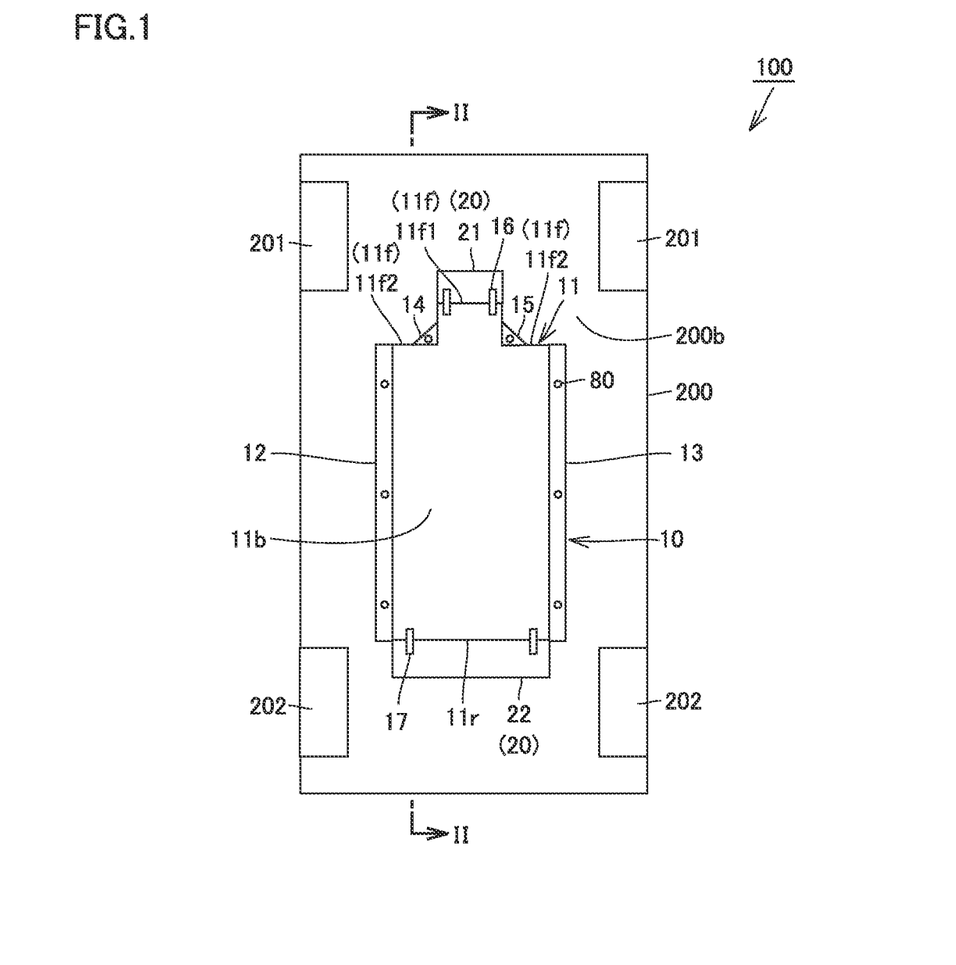
FIG. 1 is a bottom view of a vehicle according to a first embodiment.
Figure 2:
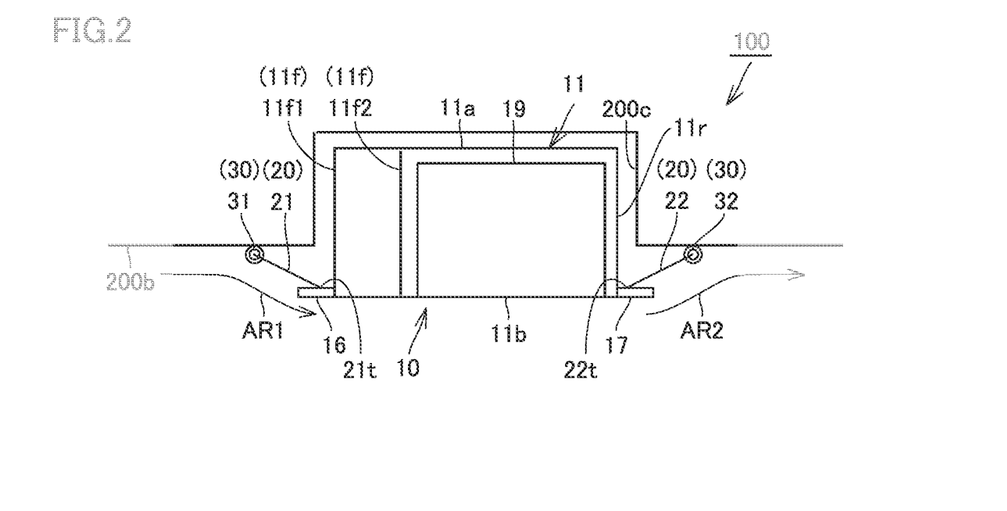
FIG. 2 is a schematic view showing a fixed state in which the power storage device is fixed to the vehicle in the vehicle according to the first embodiment.

FIG. 1 is a bottom view of a vehicle according to a first embodiment. FIG. 2 is a schematic view showing a fixed state in which the power storage device is fixed to the vehicle in the vehicle according to the first embodiment. FIG. 2 is a schematic cross-sectional view taken along the line II-II of FIG. 1. A vehicle 100 according to a first embodiment will be described with reference to FIGS. 1 and 2.

As shown in FIGS. 1 and 2, a vehicle 100 includes a vehicle body 200, a pair of front wheels 201, a pair of rear wheels 202, a power storage device 10, a flow regulation plate 20, and a support portion 30.

The vehicle body 200 has a bottom portion 200*b*. The bottom portion 200*b* is provided with an insertion region 200*c* into which the upper side of the power storage device 10 is inserted. The insertion region 200*c* is provided to be recessed upward.

The power storage device 10 includes a main body 11, a pair of lateral fastening portions 12 and 13, a pair of front fastening portions 14 and 15, and a plurality of protruding portions (specifically, a front-side protruding portion 16 and a rear-side protruding portion 17).

The main body 11 has a substantially box shape. The main body 11 includes a front wall portion 11*f*, a rear wall portion 11*r*, a top surface 11*a*, and a lower surface 11*b*. A power storage module 19 is accommodated in the main body 11. The power storage module 19 is formed by arranging a plurality of power storage cells.

The power storage cell is, for example, a secondary battery such as a nickel hydride battery or a lithium ion battery. The power storage cell may use either a liquid electrolyte or a solid electrolyte. The storage cell may be a unit capacitor configured to be capable of storing electric power.

In the main body 11, a cooling device (not shown) for cooling the power storage module 19 may be provided between the power storage module 19 and the lower surface 11*b*.

The front wall portion 11*f* and the rear wall portion 11*r* are disposed so as to face each other in the front-rear direction of the vehicle body 200. The front wall portion 11*f* is positioned on the front side in the front-rear direction. The rear wall portion 11*r* is positioned rearward in the front-rear direction. The lower surface 11*b* is provided to connect the lower end of the front wall portion 11*f* and the lower end of the rear wall portion 11*r*.

The front wall portion 11*f* includes a protruding wall portion 11*f*1 and both end side wall portions 11*f*2. The protruding wall portion 11*f*1 is provided at the center of the front wall portion 11*f* in the left-right direction of the vehicle body 200. Both end side wall portions 11*f*2 are provided on both end sides of the front wall portion 11*f* in the left-right direction. The protruding wall portion 11*f*1 is provided so as to protrude forward from both sides (the both end side wall portions 11*f*2) of the front wall portion 11*f* in the left-right direction.

An electric connector (not shown) for connecting the power storage module 19 and the electric path on the vehicle side is provided in the space of the main body 11 located inside the protruding wall portion 11*f*1. Further, a refrigerant connector for connecting the cooling device and the refrigerant path on the vehicle side may be provided in the space.

The power storage device 10 is replaceably fixed to the vehicle body 200 by a pair of lateral fastening portions 12 and 13 and a pair of front fastening portions 14 and 15.

The pair of lateral fastening portions 12 and 13 are provided on both sides of the main body 11 in the left-right direction. The pair of lateral fastening portions 12 and 13 extend in the front-rear direction. The pair of front fastening portions 14 and 15 are provided on both outer sides of the protruding wall portion 11*f*1 in the left-right direction. The pair of front fastening portions 14 and 15 are provided outside a connection portion connecting the protruding wall portion 11*f*1 and both end side wall portions 11*f*2.

The pair of lateral fastening portions 12 and 13 and the pair of front fastening portions 14 and 15 are fastened to a skeleton portion (not shown) of the vehicle body 200 by a fastening member 80, whereby the power storage device 10 is fixed to the vehicle body 200.

The plurality of protruding portions are provided on the lower surface side of the power storage device. The plurality of protruding portions are provided so as to project from the main body 11 along the front-rear direction. Specifically, the plurality of protruding portions includes a front-side protruding portion 16 and a rear-side protruding portion 17.

A plurality of front-side protruding portions 16 are provided. The plurality of front-side protruding portions 16 are provided so as to protrude forward from the main body 11. Specifically, the plurality of front-side protruding portions 16 are provided so as to project forward from the lower surface 11*b* of the portion connected to the lower end of the protruding wall portion 11*f*1.

The plurality of front-side protruding portions 16 are arranged side by side in the left-right direction. Specifically, two front-side protruding portions 16 are provided at both left and right end portions of the lower surface 11*b* in a portion connected to the lower end of the protruding wall portion 11*f*1.

A plurality of rear-side protruding portions 17 are provided. The plurality of rear-side protruding portions 17 are provided so as to project rearward from the main body 11. Specifically, the plurality of rear-side protruding portions 17 are provided so as to project rearward from the lower surface 11*b* of the main body 11 at a portion connected to the rear wall portion 11*r*.

The rear-side protruding portions 17 are arranged side by side in the left-right direction. Specifically, two rear-side protruding portions 17 are provided at both left and right end portions of the lower surface 11*b* in a portion connected to the lower end of the rear wall portion 11*r*.

The number of the front-side protruding portion 16 and the rear-side protruding portion 17 is not limited to two, and may be single or three or more.

The protruding portion may be formed of a plate-like member or a thin member such as a pin. When the protruding portion is formed of a thin member such as a pin, the traveling resistance due to the protruding portion can be reduced.

The flow regulation plate 20 regulates the airflow flowing along the bottom portion 200*b* of the vehicle body 200 during traveling. The flow regulation plate 20 has a distal end portion at a position spaced downward from the bottom portion 200*b*. The flow regulation plate 20 is provided so as to be pivotable between a state in which the distal end portion approaches the power storage device 10 and a state in which the distal end portion moves away from the power storage device 10. The flow regulation plate 20 includes a first flow regulation plate 21 and a second flow regulation plate 22.

The first flow regulation plate 21 has a plate shape. The first flow regulation plate 21 is provided so as to be opposed to the front wall portion 11*f* from the front side. More specifically, the first flow regulation plate 21 is provided so as to be opposed to the protruding wall portion 11*f*1 from the front side.

The first flow regulation plate 21 has a first distal end portion 21*t* at a position spaced downward from the bottom portion 200*b*. The first flow regulation plate 21 is pivotably provided between a state in which the first distal end portion 21*t* approaches the front wall portion 11*f* and a state in which the first distal end portion 21*t* moves away from the front wall portion 11*f*.

The second flow regulation plate 22 has a plate shape. The second flow regulation plate 22 is provided so as to be opposed to the rear wall portion 11*r* from the rear side.

The second flow regulation plate 22 has a second distal end portion 22*t* at a position spaced downward from the bottom portion 200*b*. The second flow regulation plate 22 is pivotably provided between a state in which the second distal end portion 22*t* approaches the rear wall portion 11*r* and a state in which the second distal end portion 22*t* moves away from the rear wall portion 11*r*.

The support portion 30 pivotably supports the flow regulation plate 20. In the first embodiment, the support portion 30 supports the flow regulation plate 20 so as to be pivotable on a pivot axis parallel to the left-right direction of the vehicle body 200. The support portion 30 is provided on the bottom portion 200*b*.

The support portion 30 includes a first support portion 31 and a second support portion 32. The first support portion 31 is provided in front of the power storage device 10, and pivotably supports the first flow regulation plate 21. The second support portion 32 is provided rearward of the power storage device 10, and pivotably supports the second flow regulation plate 22.

As shown in FIG. 2, in a fixed state in which the power storage device 10 is fixed to the vehicle body 200, the protruding portion abuts on the flow regulation plate 20, whereby the flow regulation plate 20 is maintained in a state of covering at least one of the front wall portion 1 if and the rear wall portion 11*r* of a portion positioned below the bottom portion 200*b*.

Specifically, in the fixed state, the front-side protruding portion 16 comes into contact with the first flow regulation plate 21, that is, the front-side protruding portion 16 supports the first distal end portion 21t side, whereby the state in which the first flow regulation plate 21 covers the front wall portion 11f of the portion positioned below the bottom portion 200b is maintained.

Further, in the fixed state, the rear-side protruding portion 17 comes into contact with the second flow regulation plate 22, i.e., the rear-side protruding portion 17 supports the second distal end portion 22t side, whereby the state in which the second flow regulation plate 22 covers the rear wall portion 11r of the portion positioned below the bottom portion 200b is maintained.

The first flow regulation plate 21 controls air flowing along the bottom portion 200b in a state of covering the front wall portion 11f. Specifically, the first flow regulation plate 21 controls the flow of air such that air flowing from the front side of the power storage device 10 toward the power storage device 10 is along the lower surface of the power storage device 10.

The second flow regulation plate 22 controls air flowing along the bottom portion 200b in a state of covering the rear wall portion 11r. Specifically, the second flow regulation plate 22 controls the flow of air from the lower surface of the power storage device 10 along the bottom portion 200b of the vehicle body 200 positioned on the rear side.

In this way, the airflow AR1 flowing from the front side of the vehicle can be regulated by the first flow regulation plate 21, and the traveling resistance can be reduced. Further, the second flow regulation plate 22 can suppress disturbance of the airflow AR2 on the rear wall portion side, thereby further reducing the traveling resistance.

Since air flows along the lower surface 11b of the power storage device 10 by the first flow regulation plate 21, the lower surface 11b of the main body 11 can be effectively air-cooled. As a result, the cooling efficiency of the power storage module 19 housed in the main body 11 can be increased.

Figure 3:
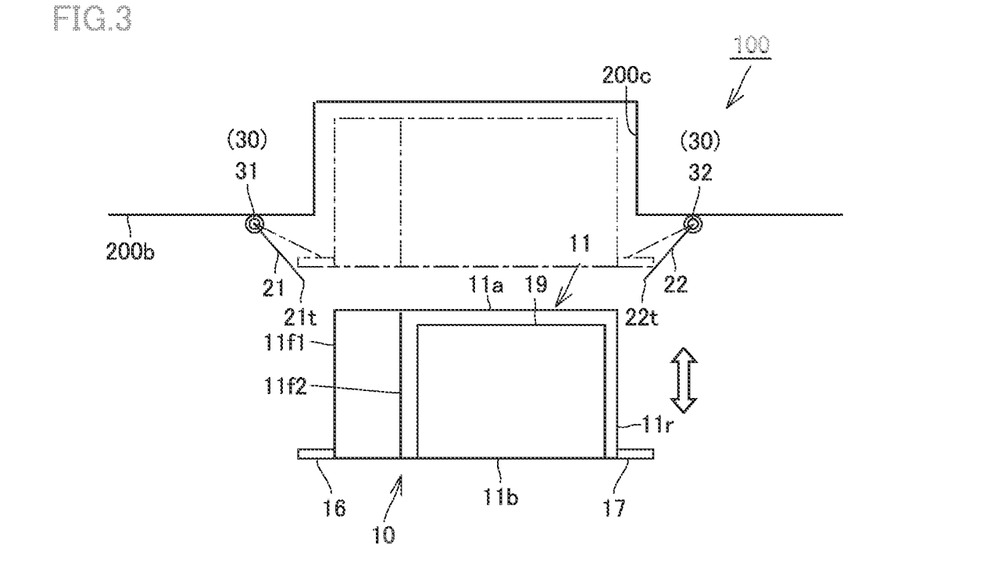
FIG. 3 is a schematic view showing a state in which a power storage device is replaced in the vehicle according to the first embodiment.

FIG. 3 is a schematic view showing a state in which a power storage device is replaced in the vehicle according to the first embodiment. As shown in FIG. 3, when the power storage device 10 is replaced with a new power storage device, the fastening of the power storage device 10 to the vehicle body 200 by the plurality of fastening members 80 is released. The release of the fastening may be performed automatically by a tool.

The power storage device 10 released from the fastening by the fastening member 80 is moved downward and transported to a predetermined storage location. When the power storage device 10 is moved downward, the front-side protruding portion 16 and the rear-side protruding portion 17 are separated from the first flow regulation plate 21 and the second flow regulation plate 22.

Thereby, the first flow regulation plate 21 pivots from the state of approaching the front wall portion 11f to the state of separating from the front wall portion 11f. The second flow regulation plate 22 pivots from a state of approaching the rear wall portion 11r to a state of separating from the rear wall portion 11r. As described above, by the pivot of the first flow regulation plate 21 and the second flow regulation plate 22, the upper side of the new power storage device can pass through the gap between the first distal end portion 21t of the first flow regulation plate 21 and the second distal end portion 22t of the second flow regulation plate 22.

Subsequently, the new power storage device is disposed below the insertion region 200c, and the new power storage device is moved upward to attach the new power storage device to the vehicle body 200 using the fastening member 80. When the new battery is moved upward, the front-side protruding portion 16 and the rear-side protruding portion 17 move upward while abutting against the first flow regulation plate 21 and the second flow regulation plate 22, whereby the first flow regulation plate 21 pivots toward the front wall portion 11f and the second flow regulation plate 22 pivots toward the rear wall portion 11r. In this state, by fixing the power storage device 10 to the vehicle body 200, the first flow regulation plate 21 maintains the state of covering the front wall portion 11f of the portion positioned below the bottom portion 200b, and the second flow regulation plate 22 maintains the state of covering the rear wall portion 11r of the portion positioned below the bottom portion 200b.

As described above, in the vehicle 100 according to the present embodiment, by providing the flow regulation plate 20 as described above, the power storage device 10 can be attached replaceably, and the traveling resistance caused by the portion of the power storage device 10 protruding downward from the bottom portion 200b of the vehicle can be reduced.

Embodiment 2

Figure 4:
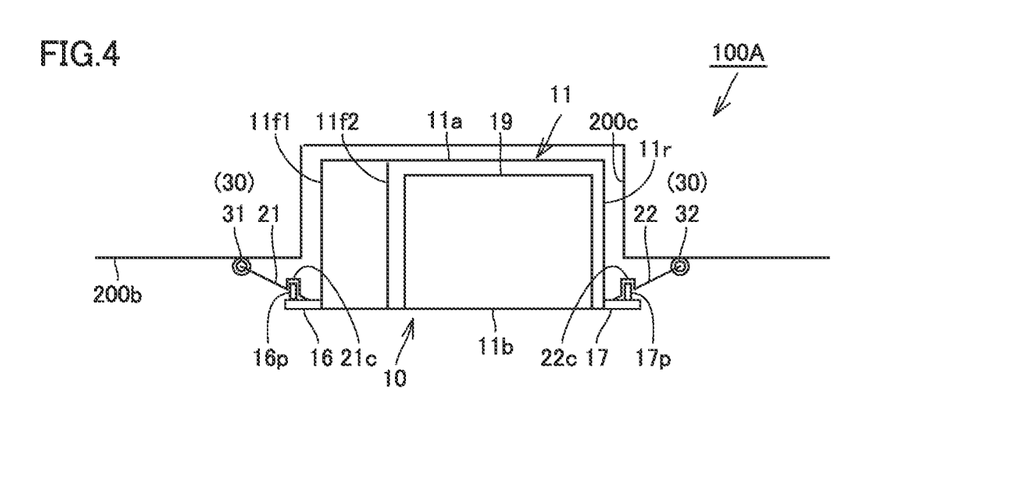
FIG. 4 is a schematic view showing a fixed state in which the power storage device is fixed to the vehicle in the vehicle according to the second embodiment.

FIG. 4 is a schematic view showing a fixed state in which the power storage device is fixed to the vehicle in the vehicle according to the second embodiment. A vehicle 100A according to a second embodiment will be described with reference to FIG. 4.

As shown in FIG. 4, the vehicle 100A according to the second embodiment differs from the vehicle 100 according to the first embodiment in the configurations of the flow regulation plate 20 and the protruding portion (specifically, the front-side protruding portion 16 and the rear-side protruding portion 17). The other configurations are substantially the same.

The protruding portion has an insert portion inserted into the flow regulation plate 20 when the power storage device 10 is fixed to the vehicle body 200, and the flow regulation plate 20 has an insert-receiving portion into which the insertion portion is inserted.

Specifically, the front-side protruding portion 16 has a first extending portion 16p which extends upward as an insert portion, and the rear-side protruding portion 17 has a second extending portion 17p which extends upward as an insert portion.

The first flow regulation plate 21 has a first concave portion 21c recessed upward as an insert-receiving portion, and the second flow regulation plate 22 has a second concave portion 22c recessed upward as an insert-receiving portion.

In the fixed state, the first extending portion 16p is inserted into the first concave portion 21c, and the second extending portion 17p is inserted into the second concave portion 22c, whereby the backlash of the first flow regulation plate 21 and the second flow regulation plate 22 during traveling can be suppressed.

Embodiment 3

Figure 5:
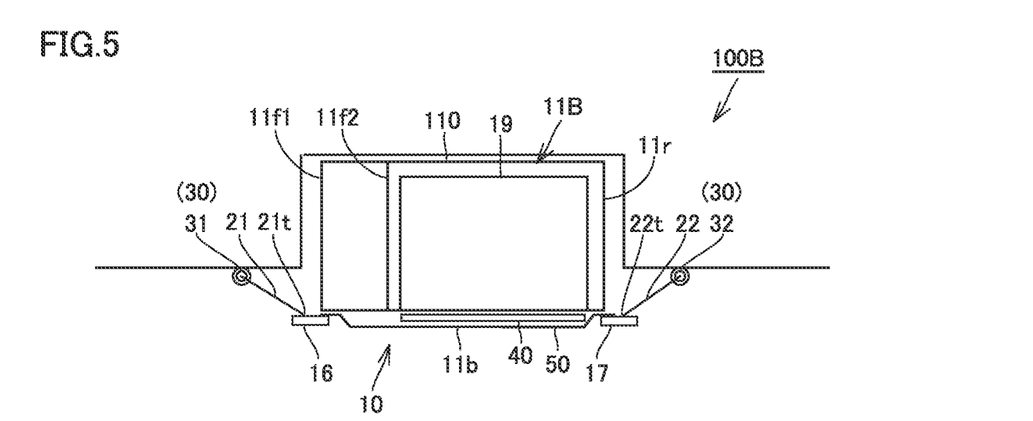
FIG. 5 is a schematic view showing a fixed state in which the power storage device is fixed to the vehicle in the vehicle according to the third embodiment.

FIG. 5 is a schematic view showing a fixed state in which the power storage device is fixed to the vehicle in the vehicle according to the third embodiment. A vehicle 100B according to a third embodiment will be described with reference to FIG. 5.

As shown in FIG. 5, the vehicle 100B according to the third embodiment differs from the vehicle 100 according to the first embodiment in the configuration of the main body 11B. The other configurations are substantially the same.

The main body 11B includes a housing case 110 for housing the power storage module 19, a cooling device 40, and a panel member 50. The housing case 110 has a substantially box shape and includes the front wall portion 11f and the rear wall portion 11r.

The panel member 50 covers the housing case 110 from below. The panel member 50 may be made of, for example, a metal member such as SUS. In the present embodiment, the panel member 50 constitutes the lower surface 11b of the main body 11B.

The cooling device 40 is disposed between the panel member 50 and the housing case 110. The cooling device 40 cools the power storage module 19 thermally brought into contact with the housing case 110 in the housing case 110 from the outside of the housing case 110.

In the present embodiment, the protruding portion is provided on the panel member 50. Specifically, the front-side protruding portion 16 is provided at the front portion of the panel member 50 so as to project forward. The rear-side protruding portion 17 is provided at a rear portion of the panel member 50 so as to project rearward.

Also in the third embodiment, substantially the same effect as in the first embodiment can be obtained. In addition, by providing the panel member 50, the housing case 110 can be protected.

Embodiment 4

Figure 6:
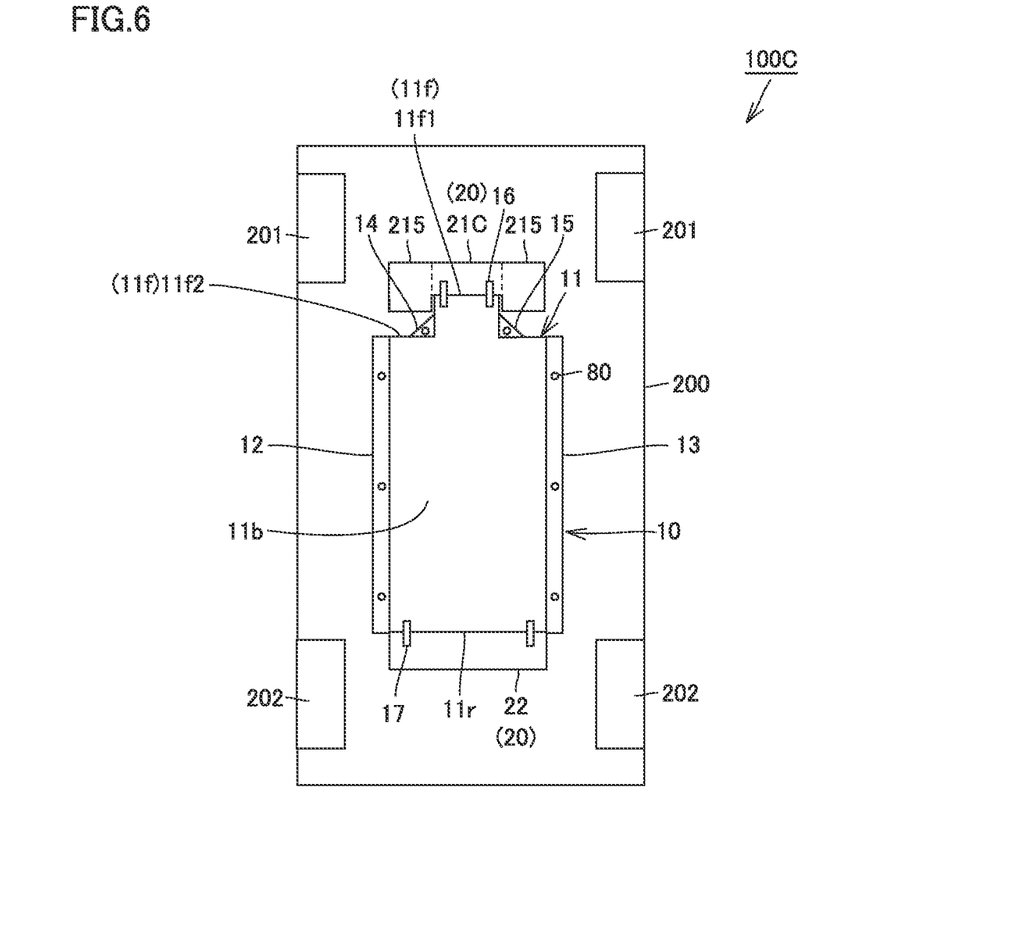
FIG. 6 is a bottom view of a vehicle according to a fourth embodiment.

FIG. 6 is a bottom view of a vehicle according to a fourth embodiment. A vehicle 100C according to a fourth embodiment will be described with reference to FIG. 6.

As shown in FIG. 6, the vehicle 100C according to the fourth embodiment differs from the vehicle 100 according to the first embodiment in the configuration of the flow regulation plate 20 (more specifically, the first flow regulation plate 21C). The other configurations are substantially the same.

The first flow regulation plate 21C has projecting portions 215 projecting outward from both sides of the protruding wall portion 11/1 in the left-right direction. The projecting portion 215 is provided so as to extend toward the front fastening portions 14 and 15.

In the fixed state, the projecting portion 215 includes a portion positioned on the front side of the front fastening portions 14 and 15. When the front fastening portions 14 and 15 are positioned below the bottom portion 200b of the vehicle body, the front fastening portions 14 and 15 may be covered by the portion from the front side.

In this case, it is possible to suppress adhesion of foreign matter to the front fastening portions 14 and 15 by the projecting portion 215.

Embodiment 5

Figure 7:
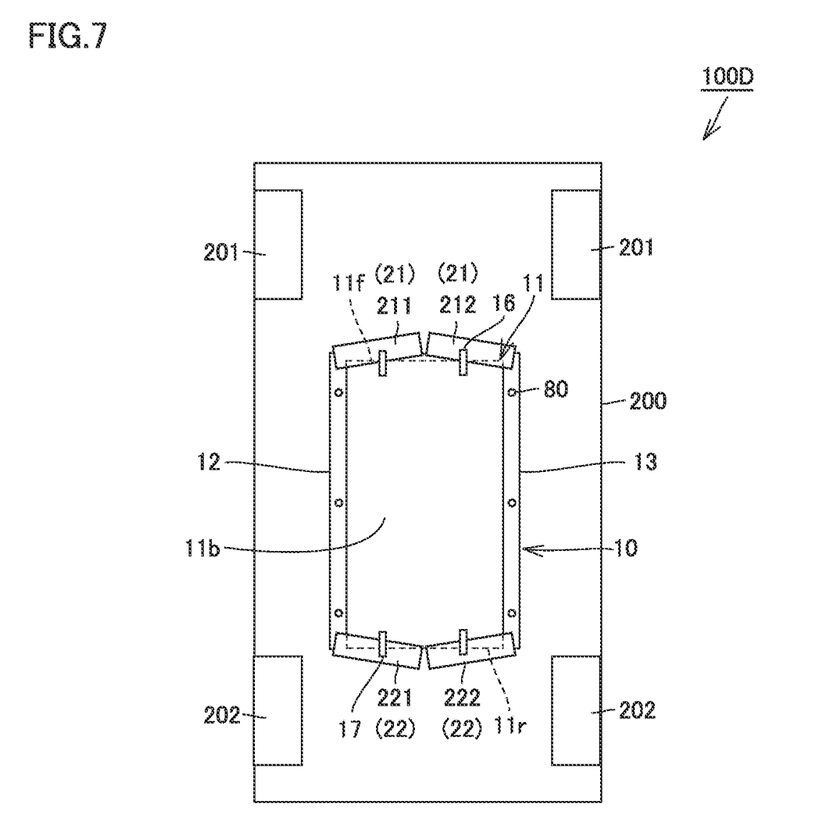
FIG. 7 is a bottom view of a vehicle according to a fifth embodiment.

FIG. 7 is a bottom view of a vehicle according to a fifth embodiment. A vehicle 100D according to a fifth embodiment will be described with reference to FIG. 7.

As shown in FIG. 7, the vehicle 100D according to the fifth embodiment is different from the vehicle 100 according to the first embodiment in terms of the configuration of the main body 11 and the fact that the flow regulation plate is divided into a plurality of flow regulation plates in the left-right direction. The other configurations are substantially the same.

In the fifth embodiment, the front wall portion 11f of the main body 11 is not provided with the protruding wall portion, but is provided flat. The front wall portion 11f is substantially parallel to the left-right direction.

The first flow regulation plate 21 includes a first plate portion 211 and a second plate portion 212. The first plate portion 211 is provided so as to extend from the center side of the power storage device 10 toward one side in the left-right direction in the left-right direction. The first plate portion 211 is inclined rearward from the center side of the power storage device 10 toward one side in the left-right direction.

The second plate portion 212 is provided so as to extend from the center side of the power storage device 10 to the other side in the left-right direction in the left-right direction. The second plate portion 212 is inclined rearward from the center side of the power storage device 10 toward the other side in the left-right direction.

The second flow regulation plate 22 includes a third plate portion 221 and a fourth plate portion 222. The third plate portion 221 is provided so as to extend from the center side of the power storage device 10 toward one side in the left-right direction in the left-right direction. The third plate portion 221 is provided so as to be inclined toward the front side from the center side of the power storage device 10 toward one side in the left-right direction.

The fourth plate portion 222 is provided so as to extend from the center side of the power storage device 10 to the other side in the left-right direction in the left-right direction. The fourth plate portion 222 is provided so as to be inclined toward the front side from the center side of the power storage device 10 toward the other side in the left-right direction.

Thus, the first flow regulation plate 21 and the second flow regulation plate 22 may be divided into a plurality of portions in the left-right direction. In this case, the air flow can be adjusted over a wide range by the plurality of flow regulation plates to reduce the traveling resistance. Further, as compared with the case of using a single flow regulation plate, the degree of freedom of design is increased, and the flow of the airflow can be controlled more appropriately.

Other Modified Examples

In the first to fifth embodiments described above, the case where the flow regulation plate includes a plate (first flow regulation plate) that covers the front wall portion 11f from the front side and a plate (second flow regulation plate) that covers the rear wall portion 11r from the rear side, and the flow regulation plate is provided so as to be able to face both the front wall portion 1 if and the rear wall portion 11r has been described as an example, but the present disclosure is not limited thereto.

The flow regulation plate may be provided so as to be opposed to at least one of the front wall portion 11f and the rear wall portion 11r. For example, the flow regulation plate may include only the first flow regulation plate, or may include only the second flow regulation plate.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:
1. A vehicle comprising:
a vehicle body having a bottom portion;

a power storage device including a main body and replaceably fixed to the bottom portion, the main body having a front wall portion, a rear wall portion, and a lower surface, the front wall portion and the rear wall portion facing each other in a front-rear direction of the vehicle body; and a flow regulation plate having a distal end portion at a position spaced downward from the bottom portion, wherein a protruding portion that protrudes from the main body along the front-rear direction is provided on the lower surface side of the main body, in a fixed state in which the power storage device is fixed to the vehicle body, the lower surface of the main body is located downward of the bottom portion, the flow regulation plate is provided to be able to face at least one of the front wall portion and the rear wall portion in the front-rear direction, and pivotable between a state in which the distal end portion is located closer to the power storage device and a state in which the distal end portion is located further away from the power storage device, and in the fixed state, the protruding portion abuts against the flow regulation plate to maintain a state in which the flow regulation plate covers a portion, located downward of the bottom portion, of at least one of the front wall portion and the rear wall portion.

2. The vehicle according to claim 1, wherein the flow regulation plate is divided into a plurality of flow regulation plates in a left-right direction of the vehicle body.

3. The vehicle according to claim 1, wherein the flow regulation plate includes a first flow regulation plate provided to be able to face the front wall portion from a front side, the front wall portion includes a protruding wall portion protruding frontward and located centrally of the vehicle body in a left-right direction, respective fastening portions for fixing the power storage device to the bottom portion are provided on opposite outer sides of the protruding wall portion in the left-right direction, the first flow regulation plate includes respective projecting portions projecting outward of opposite outer sides of the protruding wall portion in the left-right direction, and in the fixed state, the projecting portions have respective portions located frontward of the fastening portions.

4. The vehicle according to claim 1, wherein the main body includes: a housing case having the front wall portion and the rear wall portion and housing a power storage module; and a panel member covering the housing case from below and forming the lower surface, and the protruding portion is provided on the panel member.

5. The vehicle according to claim 1, wherein the protruding portion has an insert portion inserted in the flow regulation plate in the fixed state, and the flow regulation plate has an insert-receiving portion in which the insert portion is inserted.

6. The vehicle according to claim 1, wherein the flow regulation plate includes:

a first flow regulation plate having a first distal end portion at a position spaced downward from the bottom portion, and provided to be able to face the front wall portion from a front side; and a second flow regulation plate having a second distal end portion at a position spaced downward from the bottom portion, and provided to be able to face the rear wall portion from a rear side, the protruding portion includes a front-side protruding portion protruding frontward from the main body, and a rear-side protruding portion protruding rearward from the main body, the first flow regulation plate is provided to be pivotable between a state in which the first distal end portion is located closer to the front wall portion and a state in which the first distal end portion is located further away from the front wall portion, the second flow regulation plate is provided to be pivotable between a state in which the second distal end portion is located closer to the rear wall portion and a state in which the second distal end portion is located further away from the rear wall portion, in the fixed state, the front-side protruding portion abuts against the first flow regulation plate to maintain a state in which the first flow regulation plate covers a portion, located downward of the bottom portion, of the front wall portion, and in the fixed state, the rear-side protruding portion abuts against the second flow regulation plate to maintain a state in which the second flow regulation plate covers a portion, located downward of the bottom portion, of the rear wall portion.

* * * * *